J. T. WALLACE.
RIVET AND BOLT MAKING MACHINE.
APPLICATION FILED AUG. 5, 1911.
1,027,017.
Patented May 21, 1912.
6 SHEETS—SHEET 3.
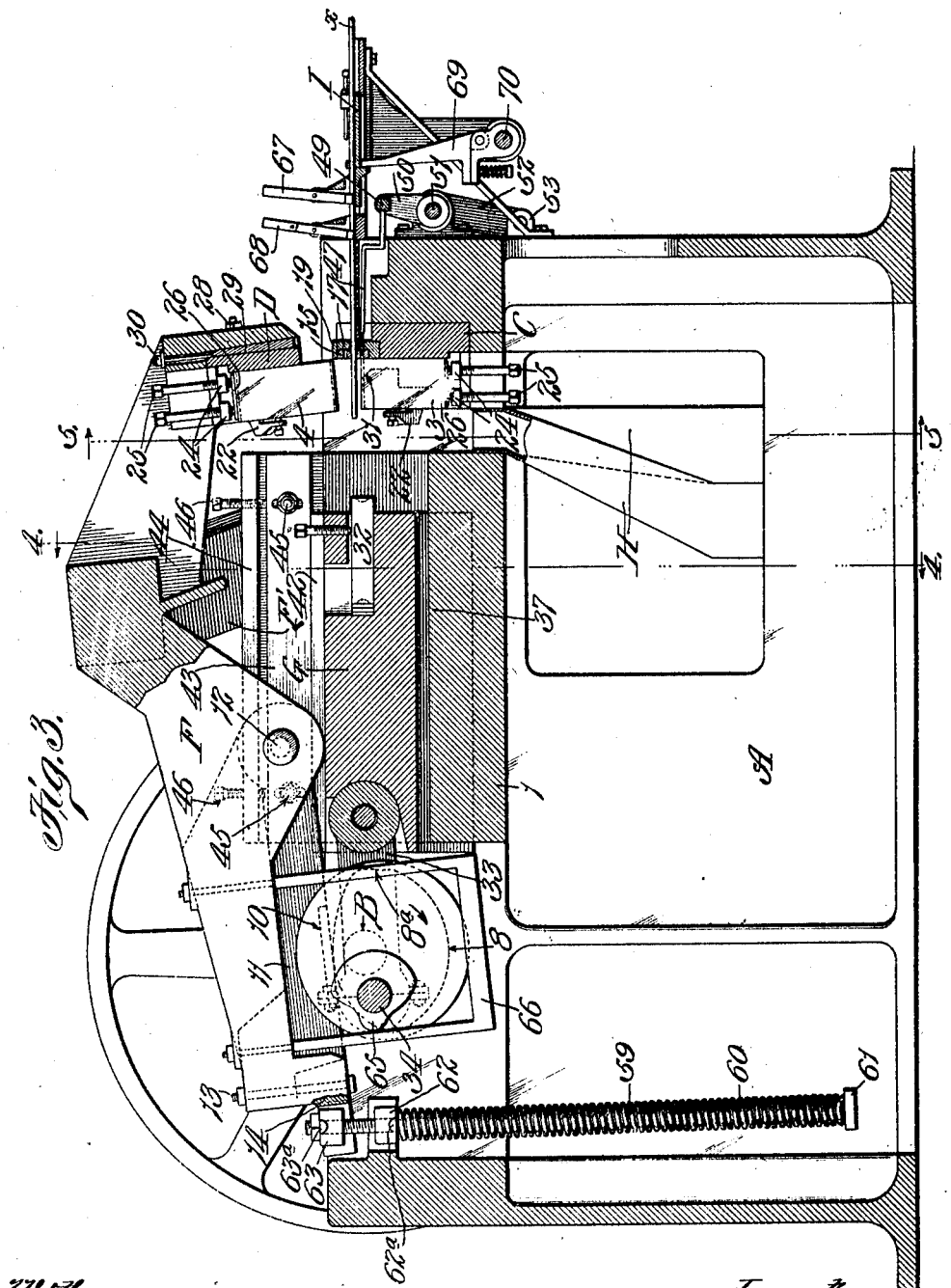

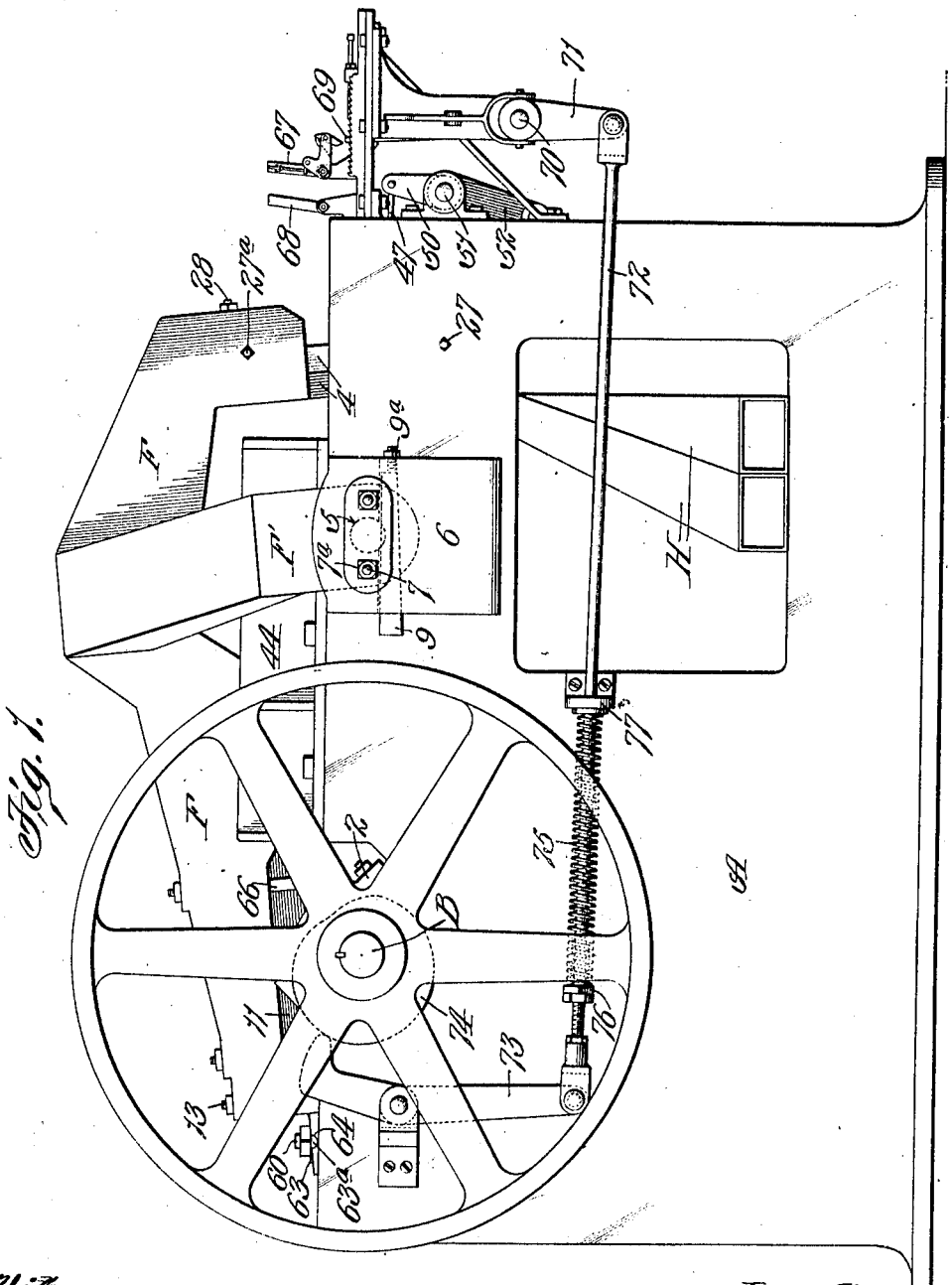

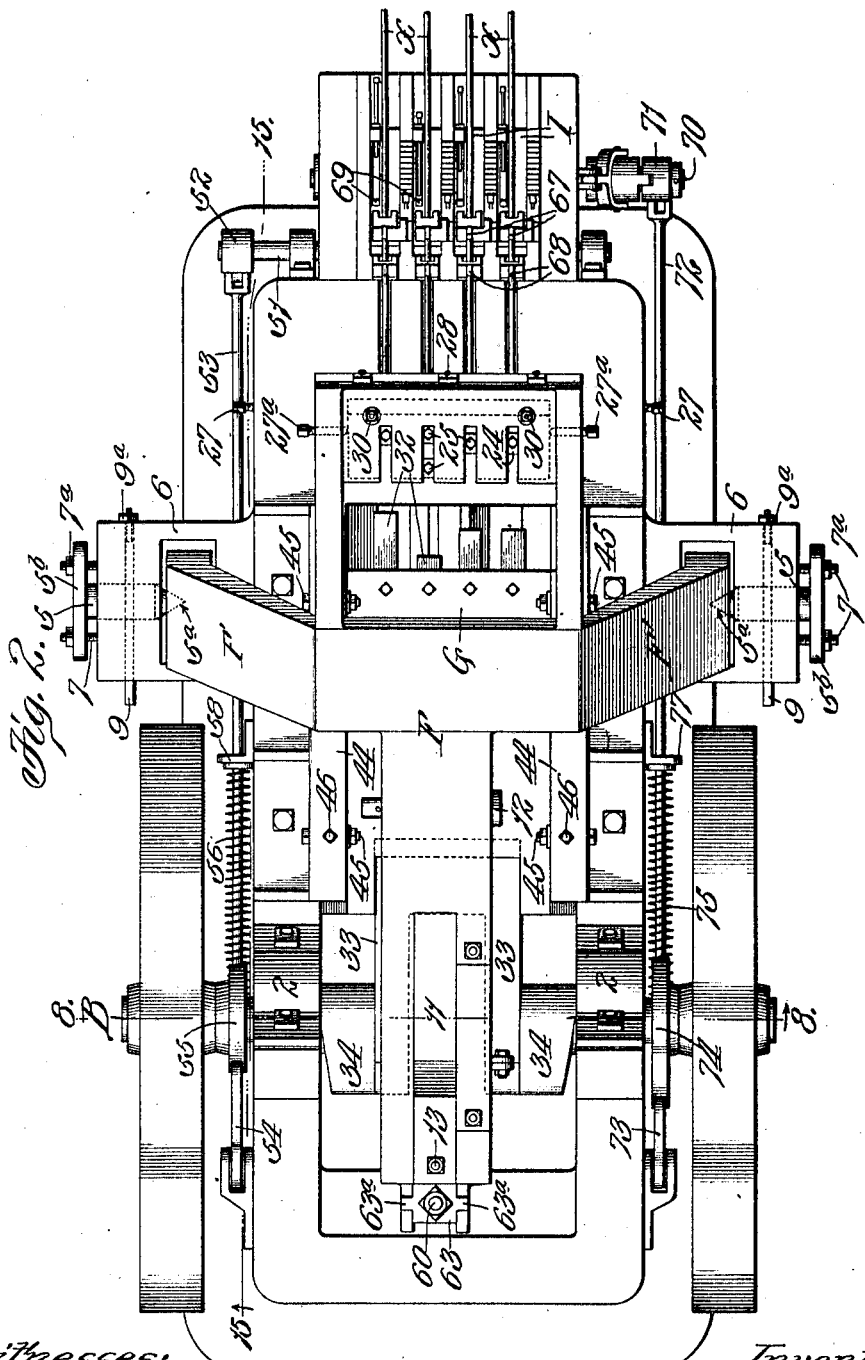

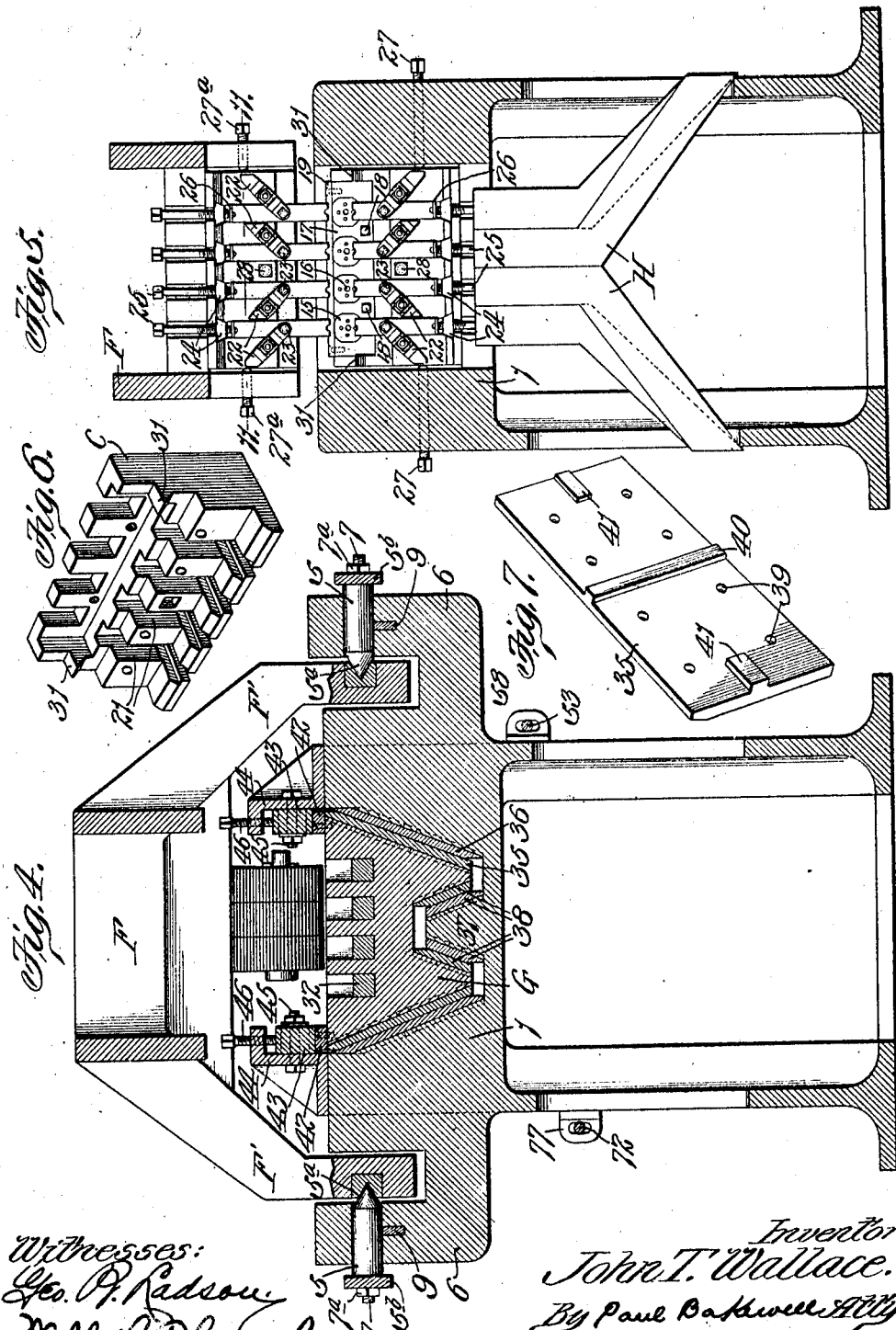

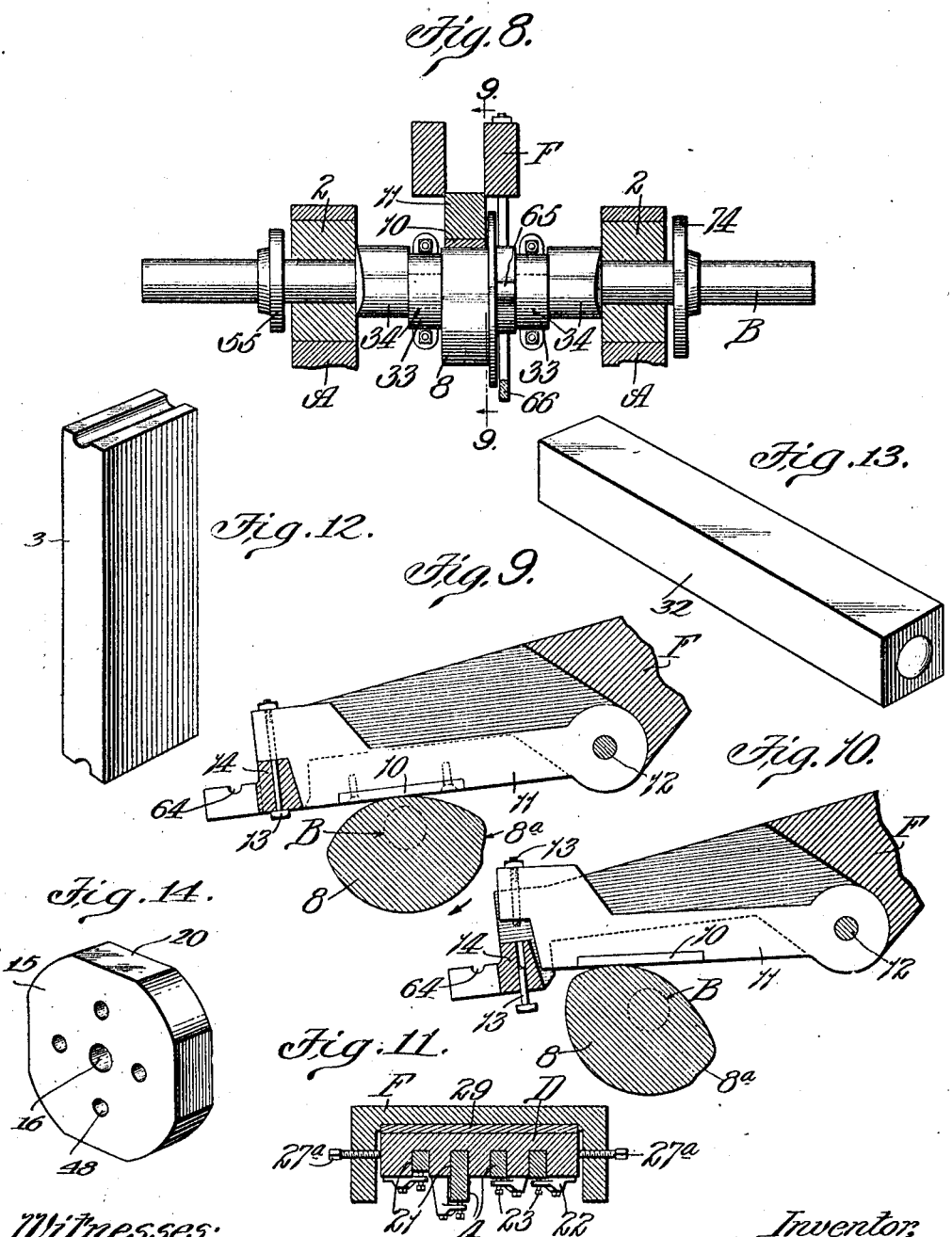

J. T. WALLACE.
RIVET AND BOLT MAKING MACHINE.
APPLICATION FILED AUG. 5, 1911.
1,027,017.
Patented May 21, 1912.
6 SHEETS—SHEET 6.
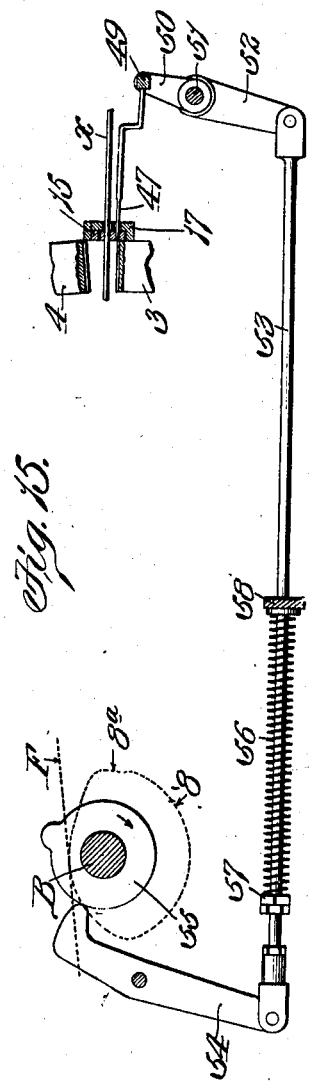
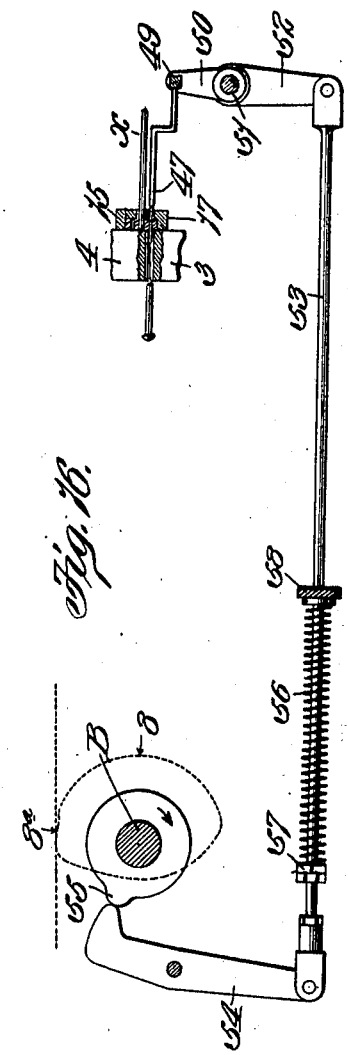

UNITED STATES PATENT OFFICE.

JOHN T. WALLACE, OF ST. LOUIS, MISSOURI.

RIVET AND BOLT MAKING MACHINE.

1,027,017.  Specification of Letters Patent.  Patented May 21, 1912.

Application filed August 5, 1911. Serial No. 642,541.

*To all whom it may concern:*

Be it known that I, JOHN T. WALLACE, a citizen of the United States, residing at St. Louis, Missouri, have invented a certain new and useful Improvement in Rivet and Bolt Making Machines, of which the following is a full, clear, and exact description, such as will enable others skilled in the art to which it appertains to make and use the same.
This invention relates to machines for making rivets and bolts.

One object of my invention is to provide a compact rivet and bolt making machine that has a greater capacity than the machines heretofore in use, and which can be maintained and operated by less skillful mechanics and at a lower cost than such prior machines.

Another object is to provide a machine of the character described that comprises comparatively few parts which are so constructed and combined together that there is very little liability of lost motion developing between the coöperating moving parts of the machine, thus insuring perfect alinement of the dies, ejecting mechanism and header.

Another object is to provide a rivet and bolt making machine which is so designed that the dies and other parts which have to be adjusted can be set in position quickly and accurately by workmen of only ordinary skill.

Another object is to provide a rivet and bolt making machine in which the ejecting mechanism and the member that carries the movable dies are so arranged and operated with relation to each other that there is no liability of the articles sticking to the dies when the dies are separated. And still another object is to provide a compact machine of simple construction which will make a plurality of articles simultaneously at each operation of the machine, the machine being so designed that articles of the same size or of different size can be made at the same time.

Other objects and desirable features of my invention will be hereinafter pointed out.
In view of the fact that the machine herein shown is adapted to be used for making either rivets or bolts, I will hereinafter use the term "article" in referring to the product of the machine.

Figure 1 of the drawings is a side elevational view of a machine constructed in accordance with my invention; Fig. 2 is a top plan view of said machine; Fig. 3 is a vertical longitudinal sectional view; Fig. 4 is a vertical transverse sectional view taken on approximately the line 4—4 of Fig. 3; Fig. 5 is a vertical transverse sectional view taken on approximately the line 5—5 of Fig. 3; Fig. 6 is a perspective view of the lower die block; Fig. 7 is a perspective view of one of the wear plates on the cross-head which carries the headers; Fig. 8 is a vertical cross sectional view taken on approximately the line 8—8 of Fig. 2; Fig. 9 is a detail sectional view taken on approximately the line 9—9 of Fig. 8; Fig. 10 is a view similar to Fig. 9 showing the operation of the safety device; Fig. 11 is a cross sectional view of the upper die block taken on approximately the line 11—11 of Fig. 5;
Fig. 12 is a perspective view of one of the dies; Fig. 13 is a perspective view of one of the headers; Fig. 14 is a perspective view of one of the cutter blocks; and Figs. 15 and 16 are side elevational views of the ejecting mechanism.

Briefly described, the machine herein shown comprises a set of lower dies, a coöperating set of upper dies, means for feeding rods or bars of iron to said dies, means for severing said rods simultaneously into short sections or lengths, and means for upsetting one end of each of said short sections so as to form a head thereon and thus produce a rivet or bolt, the machine which I have herein illustrated as the preferred embodiment of my invention being provided with means for making four articles simultaneously at each cycle of operations of the machine. The upper dies are carried by a lever which is pivotally mounted intermediate its ends on bearings supported by the frame of the machine, and the headers which form the heads of the articles, are carried by a cross-head that is reciprocatingly mounted in a guideway on the frame of the machine.

An ejecting mechanism is provided for discharging the articles from the dies, and the means which is employed for separating the dies is so designed that there is no liability of the ejecting mechanism failing to dislodge the articles at each cycle of operations, thereby preventing the articles from sticking to the dies when said dies are opened. The dies are so arranged that they can be set or adjusted quickly and easily even by a workman of only ordinary skill, and means of novel construction is provided for preventing breakage of the dies or the parts of the machine which carry the dies or on which the dies are mounted, in case two or more articles should become lodged between the dies accidentally in such a manner as to prevent the dies from closing.

Referring to the drawings which illustrate the preferred form of my invention, A designates the frame of the machine which comprises a relatively thick or heavy bed-plate 1, and suitable legs, standards or vertical walls for supporting said bed-plate.

The main operating shaft B of the machine is arranged transversely of the bed-plate 1 and is journaled in suitable bearings 2 thereon, said shaft being provided with cams for operating the feeding mechanism, the ejecting mechanism, and the lever which carries the upper dies, as herein more clearly described. The lower dies 3 are mounted in a die block C that fits in an opening formed in the bed-plate 1, as shown in Figs. 3 and 5, and the upper dies 4 are mounted in a die block D which is carried by a lever F arranged above the bed-plate 1. Said lever F is provided intermediate its ends with arms F' that project laterally and downwardly, as shown in Figs. 1 and 4, and adjustable bearings 5 are mounted in stationary brackets 6 on the sides of the frame of the machine for carrying said lever. The bearings 5 preferably consist of short horizontally arranged shafts provided with pointed ends 5a, as shown in Fig. 4, that project into conical-shaped seats formed in the side faces of the arms F' on the lever F, it being preferable to form said seats in hardened blocks of metal that are set into the arms F'. Each bearing 5 is provided at its outer end with a head 5b, as shown in Fig. 2, through which laterally projecting guide rods 7 on the brackets 6 pass, said guide rods having nuts 7a mounted thereon so as to enable the bearings 5 to be forced inwardly toward the arms F' by tightening the nuts 7a. The lever F preferably consists of a large heavy casting which is so proportioned that it will successfully withstand great strains, and as said lever carries the upper dies and also actuates them, there is no liability of lost motion developing between the dies and the means which opens and closes the dies, namely, the cam 8 on the main operating shaft B, which engages the rear end of the lever F and thus depresses the front end of said lever. That is to say, by using a single member for transferring movement from the main operating shaft of the machine to the upper dies I practically eliminate lost motion and thus insure perfect alinement of the upper dies with the lower dies. The way in which the lever F is mounted reduces to a minimum the liability of the fulcrum of the lever wearing, but in case the ends of the bearings 5 do become worn slightly, said bearings can be adjusted inwardly or moved into more intimate engagement with the lever by simply adjusting the nuts 7a which are arranged at the sides of the machine in such a manner that they can be gotten at easily. Means is provided for locking the bearings 5 in adjusted position, and in the machine herein shown said means consists of wedges 9 mounted in guideways formed in the brackets 6, as shown clearly in Figs. 1, 2 and 4, and provided with nuts 9a that can be tightened so as to draw said wedges tightly against the bearings 5. The only other point of the lever F which is apt to wear is that part of the lever which is acted upon by the cam 8 but wear at this point can be corrected easily by means of a removable hardened wear plate 10 on which the cam 8 acts, as shown in Figs. 9 and 10.

The cam 8 which actuates the lever F is so designed that the upper dies are not separated completely from the lower dies until after the articles have been discharged by the ejecting mechanism so that there is very little liability of two articles becoming lodged between a pair of dies at the same time. I desire, however, to provide the machine with a safety device that will prevent the lever F, the dies, or the parts of the machine which carry the dies, from becoming broken in case an obstruction should get in the path of movement of the lever F and thus prevent it from completing its stroke or closing the dies.

The safety device of the machine herein shown consists of an arm 11 pivotally connected at 12 to the rear end of the lever F and arranged in a bifurcated portion in the rear end of said lever, as shown in Figs. 8 to 10, and a bolt or other suitable device 13 for securing the free end of the arm 11 to the lever so as to prevent said arm from moving relatively to the lever under normal conditions. The bolt 13 passes through the free end of the arm 11 and through a cross-piece 14 on the lever F and thus securely locks said arm and lever together. The cam 8, which actuates the lever F, engages the wear plate 10 on the lower edge of the arm 11 and thus rocks the lever F to which the arm 11 is connected and of which it forms a part. In case an obstruction gets in the path of movement of the lever F, however, and prevents said lever from moving its full stroke or far enough to close the dies, the bolt 13 will break, as shown in Fig. 10, and thus permit the arm 11 to move, under the influence of the cam 8 on the main operating shaft, while the lever F remains at rest. Other safety devices could, of course, be used for this purpose but I prefer to use the one herein shown, on account of its simplicity and efficiency.

The means that severs the rods or bars from which the articles are formed consists of cutter blocks 15, which coöperate with the upper dies 4, one cutter block being provided for each pair of dies. Each of said cutter blocks has a hole or opening 16 through which a rod or bar of iron $x$ is fed, and said cutter block is arranged in such a manner with relation to the upper die 4 with which it coöperates that the portion or section of the rod $x$ which projects inwardly beyond said cutter block, as shown in Fig. 3, will be severed when the die 4 moves downwardly past the opening 16 in the cutter block through which the rod passes, the cutter block and upper die coöperating with each other to form a shearing device that severs the rod $x$ flush with the front face of the cutter block. The cutter blocks 15 are preferably adjustably mounted in a cutter bar 17 that is set in a recess in the lower die block C and held in place by suitable fastening devices 18, as shown in Figs. 3 and 5, said cutter bar comprising a removable top section 19 which bears against flat faces 20 on the cutter blocks and thus holds them securely in adjusted position.

As previously stated, one object of my invention is to provide a machine in which the dies can be adjusted quickly and accurately by a workman of only ordinary skill, thereby overcoming the necessity of employing a skilled high-priced workman to operate the machine and keep it in adjustment. I accomplish this by mounting each set of cutters in a die block which can be adjusted laterally with relation to the longitudinal center of the machine, and providing devices for adjusting the dies vertically which are so arranged that they can be manipulated easily, a separate adjusting device being provided for each die.

As shown in Figs. 5 and 6, the lower die block C is provided with vertically disposed guideways 21 for the lower dies 3, each guideway having a rear wall and two side walls which embrace three sides of the die, the dies being held in their guideways by means of clamps 22 pivotally mounted on the front face of the die block C and provided with set screws 23 which are adapted to be moved into engagement with the dies so as to force them tightly against the die block. One or more nuts 24 are slidingly mounted in the die blocks C at the lower end of each of the vertically disposed guideways 21 of said die block, and bolts or set screws 25 are threaded into said nuts so as to bear against the lower end of the dies 3, as shown in Fig. 3, and thus move said dies vertically when the bolts 25 are turned, it being preferable to arrange a liner 26 between the lower end of each die 3 and the adjusting bolts 25 which coöperate with the die. The nuts 24 have tapered side walls, as shown in Fig. 5, which fit in undercut grooves or dove-tail-shaped guideways in the die block C so as to prevent said nuts from turning when the bolts 25 are rotated. The lower die block C can be adjusted laterally by means of set screws 27 in the stationary frame A of the machine which bear against the opposite ends of said die block, as shown in Fig. 5, and any suitable means such, for example, as fastening devices 28, may be used for securely clamping the die block C to the table or bed-plate 1 of the machine, said die block being so proportioned that long or short dies can be used in same, as shown in Fig. 11, and thus make it possible to form long or short articles in the machine. The upper die block D is of similar construction to the lower die block C, just described, and set screws 27ª are employed for adjusting the upper die block D laterally. Devices 22, 23, 24, 25, 26 and 28, similar to those used in connection with the lower dies and die blocks are employed for clamping the dies 4 in position, and for adjusting the dies 4 vertically.

In order that the upper dies 4 may be adjusted accurately with relation to the cutter blocks 15 I have provided the lever F with means for moving the upper die block D longitudinally of the machine so as to move the upper dies toward or away from the cutter blocks 15. The means herein shown for adjusting said upper die block in this manner consists of a wedge 29 arranged between the die block D and the rear vertical wall of the pocket or recess of the lever F in which said upper die block is seated and provided with one or more screw-threaded shanks on which nuts 30 are mounted, as shown in Figs. 2 and 3. By adjusting the nuts 30 the die block D can be moved longitudinally of the machine and thus cause the upper dies 4 to move close enough to the cutter blocks 15 to produce a clean shearing cut. In adjusting the dies the operator arranges a bar or straight edge, not shown, on lugs 31 on the lower die block C so that said bar will extend transversely across the lower dies. Said bar is then clamped securely in position on the lugs 31, preferably by means of the lever F, and the operator thereafter adjusts the lower dies 3 vertically by turning the set screws 25 so as to cause the upper ends of said dies to bear firmly against the under side of the positioning bar. After the lower dies have been clamped securely in position and the positioning bar has been removed the upper dies 4 can be adjusted accurately by using the lower dies as stops to determine the position of the upper dies when the forward end of the lever F is fully depressed. The lateral adjustment of the dies can be effected quickly and easily by simply manipulating the set screws 27 which coöperate with the lower die block or the set screws 27' which coöperate with the upper die block.

The headers 32 which upset the ends of the rods $x$ so as to form heads on the short sections which are severed from the rods, are adjustably mounted on a cross-head G that reciprocates longitudinally of the machine in a guide way formed in the bed-plate 1 of the machine, said cross-head being pivotally connected to a link 33 which coöperates with a crank 34 on the main operating shaft B of the machine. The cross-head G has side walls which incline inwardly and downwardly, as shown in Fig. 4, and is provided with removable wear plates 35 that coöperate with removable wear plates 36 on the side walls of the guideway in which the cross-head moves. I also prefer to provide said guideway with a center rib 37, as shown in Fig. 4, which projects upwardly into a longitudinally disposed groove on the bottom face of the cross-head, the side walls of said longitudinal groove and the sides of the rib 37 being preferably inclined in the manner shown in Fig. 4 and provided with removable wear plates 38. The cross-head G is so proportioned that the lower edge of same is spaced away slightly from the bottom of the guideway in which said cross-head travels and from the upper edge of the rib 37, so that said cross-head can work downwardly as the sides of same or the sides of the guideway become worn and thus automatically take up the wear on these portions of the machine, the cross-sectional shape of said cross-head and guideway being such that there is no tendency for the wear plates on the side walls of the guideway and on the rib 37 to become grooved longitudinally adjacent their lower edges or the wear plates on the cross-head to become grooved longitudinally adjacent their upper edges. The wear plates are retained in position by means of suitable fastening devices which pass through openings 39 therein, and each wear plate is preferably provided at its center with a cross rib 40 and at its opposite end with ribs 41 arranged at approximately right angles to the rib 40 so as to securely hold the wear plate in position. Tracks 42, which are detachably connected to the top face of the cross-head G, lie underneath horizontally disposed guides 43 that are adjustably connected to brackets 44 on the bed-plate 1 of the machine, as shown in Figs. 3 and 4, said guides 43 being connected to the brackets by means of bolts 45 on the brackets that pass through elongated slots in the guides, and the brackets 44 being provided with set-screws 46 for moving said guides downwardly into intimate engagement with the tracks 42 on the cross-head.

The mechanism herein shown for ejecting the articles from the dies consists of fingers 47 mounted in openings 48 in the cutter blocks 15 and adapted to be projected slightly beyond the front faces of said cutter blocks at a certain period in the cycle of operations of the machine so as to impart a quick and sudden tap to the articles in the dies, one of said fingers being provided for each cutter block and pair of dies. All of the fingers 47 are connected to a bar 49 which is pivotally connectetd to a pair of arms 50 on a rock shaft 51 arranged transversely of the machine adjacent the front end of the bed-plate 1, as shown in Fig. 3. The rock shaft 51 is provided with a depending arm 52 to which a rod 53 is connected, and the rear end of said rod is pivotally connected to a lever 54 which is operated intermittently by means of a cam 55 on the main shaft B of the machine so as to move the fingers 47 from the position shown in Fig. 15 into the position shown in Fig. 16 and thus eject the articles from the dies. The rod 53 is moved in the opposite direction so as to restore the fingers 47 to normal position by means of a coiled compression spring 56 arranged between a collar 57 on said rod and a stationary abutment 58 on the frame of the machine. Any suitable means may be used for catching the articles as they are ejected from the dies such, for example, as receptacles H arranged under the dies, as shown in Figs. 3 and 5.

The cam 8, previously described, causes the front end of the lever F to be depressed once during each cycle of operations of the machine, and a coiled compression spring 59 is used for restoring said lever to normal position so as to separate the dies, said spring being arranged on a rod 60 between a head 61 on the lower end of said rod and a spring seat 62 that bears against the frame of the machine, as shown in Fig. 3. The upper end of the rod 60 passes through a block 63 which has trunnions 63ª that fit in curved seats or recesses 64 in the rear end or bifurcated part of the lever F, thereby permitting the lever F to assume an angular position with relation to the rod 60. In order that the rod 60 may have a slight oscillatory movement I have provided the spring seat member 62, through which said rod passes, with trunnions 62ª which fit in curved seats or recesses in a stationary bracket on the frame of the machine, the spring 59 exerting upward pressure on the member 62 and thus holding it in engagement with said bracket.

In order to eliminate the possibility of the dies sticking and thus failing to open at each cycle of operations of the machine, I have provided the crank 34 on the main shaft of the machine with a lug or projection 65, as shown in Fig. 3, that strikes against the lower side of a yoke 66 on the lever F so as to impart a quick short blow to said lever after the heads have been formed on the articles and thus cause the upper dies to move upwardly a short distance away from the lower dies. The cam 8 which depresses the front end of the lever F has a surface 8ª which is so arranged that the lever F will be held for an instant in the position to which it has been moved by the engagement of the lug 65 with the yoke 66 and thus provide sufficient time for the ejecting devices 47 to operate before the dies are completely separated. Consequently, it will be impossible for the articles to stick to the upper dies when the dies are fully opened because the articles are positively ejected before the dies are completely separated, the upper dies being raised merely far enough to release the articles but still hold them in such a position that they will be engaged by the fingers 47 and positively ejected when said fingers are operated. I do not wish it to be understood that I depend on the lug or projection 65 on the crank of the main shaft for restoring the lever F to normal position for the only function of this lug and the yoke 66 on the lever F with which it coöperates is to impart an initial stroke to the lever F and thus move it positively far enough to separate the dies sufficiently to release the article, the lever F being restored to normal position by means of the coiled compression spring 59, previously described.

Any suitable means may be employed for feeding the rods x to the dies, it being necessary, however, to use a feeding mechanism which will feed the rods intermittently and different distances in case articles of different lengths are being made in the machine.
The feeding mechanism of the machine herein shown does not form part of my present invention and therefore I have not illustrated the details of construction of said feeding mechanism. Suffice it to say that the feeding mechanism herein shown consists of a reciprocating carriage I for each rod or bar of iron x, provided with a dog 67 that grips the rod and moves it forwardly toward the die, with which said rod coöperates when said carriage moves in one direction, the rod being prevented from moving rearwardly on the return stroke of the carriage by means of a pivotally mounted dog 68 mounted on a part of the machine that is stationary with relation to the carriage I. The carriages I are moved forwardly and backwardly by means of rock arms 69 that are secured to a rock shaft 70 which is provided with a depending arm 71 to which one end of a rod or link 72 is connected, as shown in Fig. 1. The opposite end of said link is connected to a lever 73 which is actuated intermittently by a cam 74 on the main shaft B of the machine so as to move the arms 69 in one direction, and said arms are moved in the opposite direction by means of a coiled compression spring 75 mounted on the rod 72 between a collar 76 on said rod and a stationary bracket 77 on the frame of the machine.

The rods x from which the articles are formed, are fed intermittently through the openings 16 in the cutter blocks 15, and when the front end of the lever F moves downwardly said rods will be severed and clamped securely between the upper and lower dies. When the cross-head G moves forwardly the headers 32 thereon upset the ends of the short sections of rods that are clamped between the dies and thus forms heads thereon. Thereafter the lever F is raised slightly or a short distance so as to release the articles and permit the ejecting devices 47 to engage the articles and force them from the dies, the lever F being moved upwardly after the articles have been ejected so as to completely separate the dies.

A machine of the construction above described has a great capacity because it makes a plurality of articles at each cycle of operations. Furthermore, the machine is compact, and as it takes up much less space than a number of single machines a great saving of shop space is effected. In fact, a machine of this construction could be used in conjunction with the rolling machine in which the bars or rods are formed as the machine has sufficient capacity to handle the rods turned out by one rolling machine, thereby overcoming the necessity of re-heating and re-handling the rods as was necessary with the bolt and rivet making machines heretofore in use which were so constructed that only one rod could be used in the machine at one time.

Another advantage of my machine is that rivets or bolts of different sizes, lengths or kind, can be made in the machine at the same time. The means for adjusting the dies is so simple and accessible that the dies can be set quickly and accurately without the exercise of any great amount of skill on the part of the workman. The dies of such a machine will not batter up because the dies do not have to be forced together tightly enough to compensate for lost motion, this being due to the fact that a single member, namely, the lever F, is employed for transferring movement from the operating cam of the main shaft to the dies. By eliminating battering and rapid wearing of the dies I not only prolong the life of the machine but I also obtain perfect articles that are free from fins such as are produced by imperfect fitting dies. The safety device of my machine is always sure to operate whenever an obstruction gets between the dies that prevents them from closing tightly for in my machine the movable dies are actuated positively by a single lever to which the power is applied directly through means of the safety device.

Having thus described my invention, what I claim as new and desire to secure by Letters Patent is:

1. A rivet and bolt making machine comprising a bed-plate, a lower die mounted therein, a lever arranged above said bed-plate and provided with an upper die, mechanism for intermittently feeding a rod to said dies, a stationary device coöperating with the die on said lever to shear said rod into short lengths, a heading mechanism, and a cam coöperating with one end of said lever for positively moving said lever so as to close said dies.

2. A rivet and bolt making machine provided with a plurality of lower dies arranged side by side in the same horizontal plane, means for intermittently feeding a plurality of parallel arranged rods over said dies, upper dies, a lever which carries said upper dies, a cam which acts upon said lever and moves said lever so as to close said dies, stationary cutters across which said rods are fed, said cutters coöperating with one of said sets of dies to shear said rods into short sections, means for forming heads on said sections, and means for ejecting the articles from said dies.

3. A rivet and bolt making machine comprising a pair of dies, means for feeding a rod into operative position with relation to said dies, means for severing the rod into short sections or lengths, means for forming heads on said short sections, an ejecting device for discharging the completed article from the dies, and an operating mechanism for one of said dies which separates the dies slightly and holds them in this position until after the article has been discharged therefrom, said mechanism thereafter causing the dies to be completely separated.

4. In a rivet and bolt making machine, dies which hold a rod while a head is being formed thereon, an ejecting device for engaging the article and discharging it from the dies after the head has been formed on the article, and an operating mechanism for one of said dies which prevents the dies from separating completely before said ejecting device operates.

5. In a rivet and bolt making machine, a pair of dies which are adapted to clamp a rod while a head is being formed thereon so as to produce an article, means for causing said dies to separate slightly after the head has been formed on said article, an ejecting device which thereafter operates to discharge the article from the dies, and means for thereafter separating the dies completely.

6. In a rivet and bolt making machine, a pair of dies for clamping a rod while a head is being formed thereon so as to produce an article, a member which carries one of said dies, means for positively moving said member a short distance after the head has been formed on the article so as to separate the dies slightly, an ejecting device which thereafter operates to discharge the article from the dies, and a yielding means for completing the movement of said die-carrying member so as to fully open the dies.

7. In a rivet and bolt making machine, a stationary die, a movable die, a lever which carries said movable die, means acting upon said lever to close the die, independent means for imparting a quick and sudden blow to said lever so as to open the dies slightly, an ejecting device that operates after said dies have been opened slightly, and yielding means for restoring the lever to normal position.

8. In a rivet and bolt making machine, a stationary die, a movable die, a pivotally mounted lever which carries said movable die, means for feeding a rod to said dies, a cam coöperating with said lever to depress the movable die, means for severing said rod, means for forming a head on said rod when the dies are closed, means for imparting a quick and sudden blow to said lever so as to release the rod, said cam being so designed after the rod has been released, means for ejecting the article between the dies while said lever remains at rest, and yielding means that restores said lever to normal position.

9. In a rivet and bolt making machine, a stationary die, a movable die, a lever that carries said movable die, a cam that engages said lever and moves it in one direction, a spring for restoring said lever to normal position, a yoke on said lever, and a device arranged inside of said yoke and coöperating with same to positively open or separate the dies, said spring thereafter operating to restore the lever to normal position.

10. In a rivet and bolt making machine, a lever provided with a die, a coöperating stationary die, a shaft provided with a cam that moves said lever in one direction, a rod, a rockable member on said lever through which said rod passes, a coiled compression spring arranged on said rod between a head thereon and a spring seat member, and a stationary device that forms a bearing on which said spring seat member can rock during the operation of said lever.

11. In a rivet and bolt making machine, a lever provided with a die, a coöperating stationary die, a shaft provided with a cam that moves said lever in one direction, a yoke on said lever, and a crank on said shaft provided with a projection that engages said yoke so as to impart a quick sudden blow to said lever and thus positively open said dies.

12. In a rivet and bolt making machine, coöperating clamping dies, a lever having one of said dies mounted in one end thereof, arms projecting laterally and downwardly from the intermediate portion of said lever, adjustable bearing members which form a fulcrum for said lever, and means that coöperates with the opposite end of the lever for actuating the lever.

13. In a rivet and bolt making machine, coöperating clamping dies, a lever carrying one of said dies and provided intermediate its ends with arms which project outwardly and downwardly, adjustable bearing members which project into recesses in said arms, means for locking said bearing members in adjusted position, an actuating means for said lever that operates upon one end of said lever, and an upsetting die.

14. In a rivet and bolt making machine, a die-carrying member consisting of a lever provided intermediate its ends with a pair of side arms that project downwardly from the body portion of said lever, bearing members mounted in a stationary part of the machine and provided with pointed ends which project into recesses in said arms, and means for adjusting said bearing members to compensate for wear.

15. In a rivet and bolt making machine, a die-carrying member consisting of a lever provided intermediate its ends with a pair of side arms that project downwardly from the body portion of the lever, stationary brackets between which said arms are arranged, bearing members on said brackets having pointed ends which project into recesses or seats formed in the side faces of said arms, means for adjusting said bearing members, and adjustable wedges mounted in said brackets and adapted to engage said bearing members so as to lock them in adjusted position.

16. In a rivet and bolt making machine, a die-carrying member consisting of a pivotally mounted lever whose free end is bifurcated, an arm arranged in the bifurcated portion of said lever and pivotally connected thereto, a safety device that connects said arm and lever together and which is adapted to break when it is subjected to an abnormal strain, thus permitting said arm to move relatively to the lever, and an actuating member which acts upon said arm and thus transmits movement to the lever through said safety device.

17. A rivet and bolt making machine comprising a bed-plate, a movable die-carrying member arranged above the bed-plate, a die block mounted in the bed-plate and provided with a plurality of removable clamping dies, a die block mounted in said movable die-carrying member and provided with a plurality of coöperating removable clamping dies, and means for adjusting both of said die blocks laterally with respect to the longitudinal center of the machine.

18. A rivet and bolt making machine comprising a bed-plate, a movable die-carrying member arranged above the bed-plate, a die block mounted in the bed-plate and provided with a plurality of removable dies, a die block mounted in said movable die-carrying member and provided with coöperating removable dies, means for adjusting both of said die blocks laterally with respect to the longitudinal center of the machine, and means for enabling the dies in said die blocks to be adjusted vertically independently of each other and relatively to the die blocks.

19. A rivet and bolt making machine comprising a bed-plate, a movable die-carrying member arranged above the bed-plate, a die block mounted in the bed-plate and provided with a plurality of adjustable dies, a die block mounted in said movable die-carrying member and provided with coöperating adjustable dies, means for adjusting both of said die blocks laterally with respect to the longitudinal center of the machine, means for enabling the dies in said die blocks to be adjusted vertically independently of each other and relatively to the die blocks, cutter blocks which coöperate with the movable dies, and means for adjusting said movable dies toward and away from the front faces of said cutter blocks.

20. In a rivet and bolt making machine, a die block provided with vertically disposed guideways, removable dies arranged in said guideways, means for clamping said dies in position, and a separate adjusting device in the die block for moving each of the dies longitudinally of its guideway, thus enabling the dies to be adjusted independently of each other.

21. In a rivet and bolt making machine, a die block provided with guideways which are closed on three sides, adjustable dies removably mounted in said guideways, devices that engage the front faces of said dies and hold them in position, and adjustable devices arranged at one end of said guideways for moving the dies longitudinally of the guideways so as to set the dies in proper position.

22. In a rivet and bolt making machine, a die block, adjustable cutter blocks mounted in said die block, adjustable dies arranged in guideways in said die block, and means for adjusting said dies vertically independently of each other and with relation to said cutter blocks.

23. In a rivet and bolt making machine, a die block provided with vertically disposed guideways, adjustable dies arranged in said guideways, means for adjusting said dies vertically independently of each other and relatively to the die block, and devices on said die block on which a bar or straight edge can be placed so as to limit the upward movement of the different dies and thus enable them to be set accurately.

24. In a rivet and bolt making machine, a movable die-carrying member, a die block on said member provided with a plurality of dies that can be adjusted vertically independently of each other, stationary cutter blocks that coöperate with said dies to shear the rods from which the articles are formed, means for adjusting said dies relatively to said die block so as to move them toward or away from the front faces of said cutter blocks, and independent means for adjusting the cutter blocks laterally with reference to said dies.

25. In a rivet and bolt making machine, a movable die-carrying member, a die block on said member provided with a plurality of vertically adjustable clamping dies that have cutting edges, stationary cutter blocks which coöperate with said dies, and an adjustable wedge arranged between said die block and said die-carrying member for adjusting said die block so as to move all of the dies thereon toward and away from the front faces of the cutter blocks with which the dies coöperate.

26. In a rivet and bolt making machine, a bed-plate, a lever arranged above the bed-plate and fulcrumed intermediate its ends, die blocks mounted on said bed-plate and on one end of said lever, dies adjustably mounted in said die blocks, devices for clamping said dies against the die blocks in which they are mounted, an operating means that acts upon the opposite end of said lever, and a reciprocating cross-head provided with headers which move toward said dies and exert pressure thereon in the same direction as that which the clamping devices exert on the dies.

27. In a rivet and bolt-making machine, a bed-plate, dies which are adapted to clamp a rod, a reciprocating cross-head provided with a header that coöperates with said dies, said cross-head having straight side walls which incline inwardly from the top side toward the lower side of the cross-head, and a guideway for said cross-head provided with straight side walls which incline inwardly and downwardly from the upper edge of said guideway, the bottom face of the cross-head being spaced away from the bottom of said guideway so that the cross-head can work downwardly as it becomes worn without liability of causing sharp grooves or angles to be formed in the guideway.

28. In a rivet and bolt-making machine, a bed-plate, dies which are adapted to clamp a rod, a reciprocating cross-head provided with a header that coöperates with said dies, said cross-head having straight side walls which incline inwardly from the top side toward the lower side of the cross-head, a guideway for said cross-head provided with straight side walls which incline inwardly and downwardly from the upper edge of said guideway, the bottom face of the cross-head being spaced away from the bottom of said guideway so that the cross-head can work downwardly as it becomes worn without liability of causing sharp grooves or angles to be formed in the guideway, a longitudinally extending rib projecting upwardly from the bottom of the guideway and having its sides inclined in an opposite direction to the adjacent side walls of the guideway, and a groove on the under side of the cross-head for receiving said rib, the bottom of said groove being spaced away from the top face of said rib so as to not interfere with the downward movement of the cross-head as it becomes worn.

29. In a rivet and bolt making machine, a bed-plate, a reciprocating cross-head mounted on said bed-plate and provided with headers, a die block mounted in said bed-plate and provided with vertically adjustable dies, stationary cutter blocks carried by said die block, means for feeding rods through said cutter blocks into operative position over said dies, a lever arranged above the bed-plate and provided with depending side arms, adjustable bearing members which project into recesses or seats in said side arms so as to form a fulcrum for said lever, a die block on one end of said lever provided with vertically adjustable dies which coöperate with the dies on the bed-plate, and an operating means for said lever that acts upon the opposite end of the lever.

30. In a rivet and bolt making machine, a bed-plate, a reciprocating cross-head mounted on said bed-plate and provided with headers, a die block mounted in said bed-plate and provided with vertically adjustable dies, cutter blocks in said die block, means for feeding rods through said cutter blocks into operative position over said dies, a lever arranged above the bed-plate and provided with depending arms, adjustable bearing members which project into recesses or seats in said arms so as to form a fulcrum for said lever, a die block on said lever provided with vertically adjustable dies which coöperate with the dies on the bed-plate, an actuating mechanism for said lever which imparts a quick sudden blow to the lever so as to open the dies slightly and thus release the articles which have been formed by severing said rods and forming heads thereon, and ejecting devices which positively discharge the articles from said dies before the dies are completely separated.

In testimony whereof I hereunto affix my signature in the presence of two witnesses, this first day of August 1911.

JOHN T. WALLACE.

Witnesses:
    WELLS L. CHURCH,
    GEORGE BAKEWELL.